W. H. WALKER.
AUTOMATIC RELEASE KEY.
APPLICATION FILED JAN. 23, 1918.
1,289,977.
Patented Dec. 31, 1918.
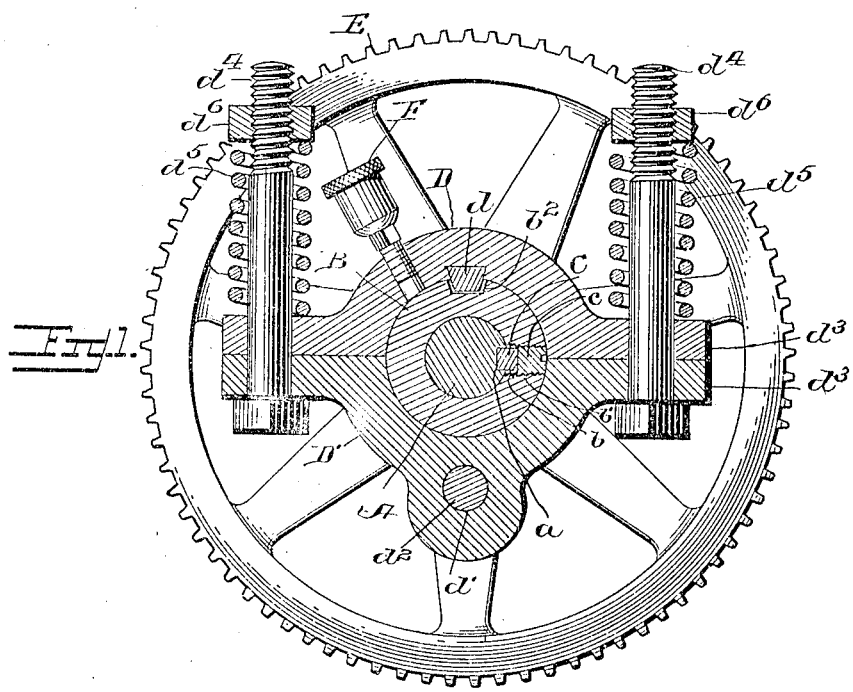
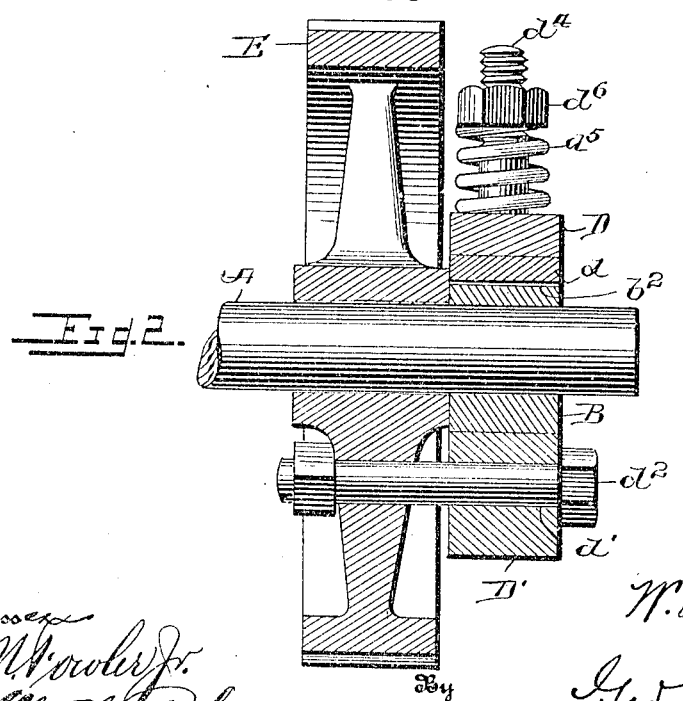

UNITED STATES PATENT OFFICE.

WILLIAM H. WALKER, OF PINE BLUFF, ARKANSAS.

AUTOMATIC RELEASE-KEY.

1,289,977. Specification of Letters Patent. Patented Dec. 31, 1918.

Application filed January 23, 1918. Serial No. 213,340.

*To all whom it may concern:*

Be it known that I, WILLIAM H. WALKER, a citizen of the United States, residing at Pine Bluff, in the county of Jefferson and State of Arkansas, have invented certain new and useful Improvements in Automatic Release-Keys, of which the following is a specification.

The invention relates to a release key for automatically releasing a driven gear wheel or pulley from its shaft under an overload or excessive strain.

The object of the invention is to provide a simple and efficient overload release key in the form of a two-part separable sleeve, the members of which are held together by spring pressure upon a collar adapted to be secured upon a driven shaft, the inner face of one sleeve member having a transverse release key separably engaging a transverse key-way or groove across the outer face of said shaft collar.

This object I accomplish by the construction shown in the accompanying drawing, in which:

Figure 1 is a vertical cross section of my improved release key applied to a gear.

Fig. 2 is a section on line 2, Fig. 1.

A designates a shaft having a key-way $a$, B is a collar provided with an internal groove or key-way $b$ registering with the groove or key-way $a$, and C is a key entering the key-ways or grooves $a$, $b$ and fixedly securing the collar B upon the shaft A. The key C is held in place by a set-screw $c$, passed through a threaded aperture $b'$, in the collar B. The collar B is further provided with a key-way or groove $b^2$ across its outer side. A two-part releaser D, D' is mounted upon the collar B and is provided on the inner face of one member D, with a release key $d$, which releasably engages the key-way or groove $b^2$ of collar B, while the other member D' of said releaser has a transverse aperture $d'$ through which is passed a bolt $d^2$ which secures the releaser to a gear or pulley E loose upon shaft A.

The two-part releaser D D' is in the form of half round sleeves provided with outwardly extending flanges $d^3$ $d^3$ which lie face to face. Bolts $d^4$ extend through apertures in the flanges $d^3$ $d^3$, and upon these bolts are mounted coil springs $d^5$ $d^5$ bearing at one end against the flanges $d^3$ $d^3$ and at their outer ends engaged by tension adjusting nuts $d^6$ $d^6$. A suitable lubricator F is mounted on member D of the releaser to supply a lubricant to the adjacent surfaces of sleeve B and releaser D D'.

The operation is as follows: The wheel E, to which the power is applied, will cause the shaft A to rotate with it until the load or strain is sufficiently above normal to cause the releaser members to separate and release the collar B fast on shaft A. This releasing is rendered possible by slightly rounding or inclining the walls of the release key $d$ and key-way or groove $b^2$ so that when a too great strain is applied to releaser D D' the member D will be forced outwardly against the tension of springs $d^5$ $d^5$. By adjusting the nuts $d^6$ $d^6$ and tension of springs $d^5$ $d^5$ the releaser may be set for any desired overload or strain. The pulley or gear, when released, will continue to rotate until the load or strain returns to normal, whereupon the key $d$ will again engage the groove $b^2$ and rotate the shaft A again.

What I claim is:

1. An overload shaft releaser comprising a collar adapted to be fixedly secured upon a shaft, a two-part, separable, spring controlled releaser mounted upon the said collar, and adapted to be secured to a loose pulley or gear, and separable connecting means between the collar and one member of said releaser.

2. An overload shaft releaser comprising a collar adapted to be fixedly secured to a shaft, a two-part separable releaser comprising half sleeves embracing said collar, adjusting bolts and tension springs pressing the half sleeves together, a key and groove connection between the collar and one of said shaft sleeves adapted under an overload to cause release of the collar, and means for securing one member of the two-part releaser to a loose gear or pulley.

3. The combination with a shaft having a fixed collar provided with a key-way, of an automatic release key engaging said key-way, a separable spring pressed two-part sleeve to one member of which said release key is attached, and means for securing one of said sleeve members to a loose wheel.

4. The combination with a shaft having a fixed grooved collar and a loose pulley or gear, of an automatically operating release key engaging said collar groove and separable spring pressed sleeve members, one of which is secured to said loose pulley or gear and to the other of which the said key is secured.

5. In an automatic release key, a two-part sleeve having springs holding the said members yieldingly together, and a key across the inner face of one member, and means for securing one sleeve member to a driving wheel.

In testimony whereof I affix my signature.

WILLIAM H. WALKER.